Patented July 29, 1930

1,771,477

UNITED STATES PATENT OFFICE

WILLIAM H. ALTON, OF NEW YORK, N. Y., ASSIGNOR TO R. T. VANDERBILT COMPANY, INCORPORATED, OF NEW YORK, N. Y., A CORPORATION OF NEW YORK

TREATMENT OF CLAY

No Drawing.   Application filed July 24, 1928. Serial No. 295,124.

This invention relates to the treatment of clay, and more particularly to the separation of clay from grit to produce a substantially grit-free clay product.

In the usual deposits of secondary clays of the kaolin type, especially those most common to the States of North and South Carolina and of Georgia, the gritty matter with which they are combined is found in the form of small quartz particles together with flakes of mica, both of which have to be removed before the clay can be used in the manufacture of paper, etc., because, no matter how finely the grit may be ground by machinery, into the body of the clay, the quartz always remains as a microscopic grit to weaken the fabric, and the mica shows in the finished product as a shining speck or is liable to drop out of the paper or a film, leaving tiny holes.

I have found that when large lumps of air dried clay are broken down without actual ginding, their tendency is to break up into finely divided clay and into little pellets about the size of the head of a pin, each of which has a grain of grit for its heart. The grit particles themselves are small, for example, 80% of the grit in one case passing through a 60 mesh screen. Apparently the clay immediately adjacent the grit particles is more resistant to crushing.

The method commonly employed heretofore for treating clay to separate grit from it has been that of agitating the clay in the presence of enough water to soften it to a point where it will disintegrate, using usually around nine times as much water as clay. After the clay has been softened so as to set free the particles of grit to which they have been adhering, the thin slurry of clay is passed through a series of troughs with cleats across the bottom or pockets called "riffles" in which the particles of grit are caught, due to their greater specific gravity, while the clay itself goes over the riffles and is collected in vats or tanks and allowed to settle. The water is then siphoned off, leaving a layer of clay mud which requires several days or even weeks to sufficiently evaporate for handling in a dry house where it is further dried and then packaged for delivery to the consumer. While this wet method of washing clay to free it from grit is adequate, it is wasteful and expensive, and requires the drying out of a large amount of water with artificial heat.

According to the present invention, the clay with its fine grit particles in it is treated in a dry way without the necessity of using a large amount of water, and of removing the added water from the clay.

According to the present process, the large lumps of clay mined from the clay bed are first subjected to atmospheric drying or air drying by allowing them to stand several days in a "dry shed." They are then broken down into fine clay and pellets by passage through some form of disintegrator, taking care not to exert an abrading or grinding action which will reduce the grit-carrying pellets to a size finer than the head of a pin, nor to splinter or reduce the size of the grits themselves. A cage mill or hammer mill type of disintegrator can be employed, with regulation of the disintegrating operation. Ordinary rough crushing rolls can also be employed since it is not necessary in the present process that all of the clay except that immediately adjacent the grit particles be separated therefrom.

The preliminarily air dried and disintegrated mixture of free clay and grit-carrying pellets is passed though a dryer such as a fixed or rotary artificial dryer, in which the moisture is reduced to a suitable extent, for example, to about 1%. This reduction is of free moisture, since the clay itself which contains water of hydration is not chemically dehydrated. As a result of the drying operation there is obtained a dry mixture made up of fine clay particles and of grit-carrying pellets and consisting, for example, of around 50% fine free clay and 50% more or less of grit-carrying pellets, although the amount of free clay may be considerably in excess of 50%.

According to the present invention the preliminarily disintegrated and dried clay is subjected to a combined air separation and attrition process by means of which the fine clay is separated, and the clay contained in the grit-carrying pellets is gradually separated therefrom and removed by air separation leaving a gritty residue behind containing substantially all of the grit admixed with a limited amount of unseparated clay.

The combined air separation and attrition process of the present invention can be carried out in different types of apparatus. One suitable type is a horizontal rotating cylinder made of material which will not blacken or corrode the clay and into which the clay is fed at one end and the gritty residue discharged from the other. The cylinders may be of seamless metal, iron, or wood, and suitably lined.

Within this rotating cylinder I provide some form of media which will have a mild and regulated attrition or grinding action upon the grit-bearing pellets to gradually separate the adhering clay therefrom without grinding up the grit particles themselves to a fine powder. The cylinders may thus be filled or partly filled with small solid rubber balls which, as the cylinder revolves and as the balls tumble and roll over each other will exert a rubbing action on the grit-carrying clay pellets and rub off and set free the adhering clay from the little particles of grit, without fracturing or reducing the grits themselves to a fine powder, but rather freeing them intact or substantially so.

During the passage of the clay through this horizontal rotating cylinder there is passed therethrough a current of air or gas which will serve to sweep out of the cylinder the fine particles of clay. The tumbling of the clay will throw the fine particles into suspension in the air and the air current passing through the cylinder will carry these fine clay particles with it. There is thus obtained an air separation of the fine clay particles which are progressively removed from the clay as it passes through the rotating cylinder.

The current of air passing through the cylinder enters at the discharge end and the clay-laden air escapes at the feed end of the cylinder. The grinding or rubbing action upon the pellets may be localized in that part of the cylinder near the discharge end so that, as the preliminarily rough crushed and dried mixture of fine clay and grit-bearing pellets enter the feed end of the cylinder, the current of air passing through will remove a large part of the fine clay particles before the grit-bearing pellets are subjected to the rubbing and disintegrating treatment in the cylinder. As the pellets are then subjected to disintegration and the clay rubbed off from them, it tends to escape with the current of air so that the clay is progressively freed from the grit and progressively removed from the cylinder, leaving the grit and unseparated clay for discharge from the discharge end of the cylinder.

The current of clay-laden air escaping from the cylinder passes through a collector for separating the clay from the air, and the clay is thus directly obtained in a form ready for packaging.

The grit contained in the grit-bearing pellets is heavier than the clay, and by regulating the current of air passing through the cylinder, the clay can be picked up by the air without picking up the heavier grit particles, thereby effecting a selective separation of the fine clay from the grit.

The mixture of grit and unseparated clay discharged from the cylinder may be subjected to further treatment to separate additional admixed clay from the grit, if the separation is not sufficiently complete in the rotating cylinder.

It will thus be seen that in the present process the clay is subjected to a preliminary rough crushing or disintegration and to drying to give a mixture of fine clay and grit-bearing pellets and that the clay is subsequently subjected to a combined air separation and disintegration of a character which will separate the fine clay particles from the grit and recover them directly in a marketable form. The clay subjected to this combined air separation and rubbing or grinding treatment may be that which has merely been preliminarily rough crushed and dried, or it may have been first freed from part of the fine clay particles which it contains, in which case the mixture of grit-bearing pellets and clay subjected to the combined crushing and air separation treatment will have been freed from part of the admixed fine clay and will be further crushed and will have additional fine clay separated therefrom during the combined crushing and air separating treatment.

The combined air separation and attrition treatment of the present invention can be carried out in one or more stages and in one or more series of operations with progressive separation of the fine clay and progressive breaking up of the grit-bearing pellets and the freeing of the fine clay from the grit.

I claim:—

1. The method of treating clay which comprises subjecting clay comprising grit of substantially imperceptible fineness to a preliminary drying and rough disintegration, and subjecting the resulting clay to a combined air separation and detrition to further separate the clay from grit-bearing pellets without breaking down the grit particles and to recover the fine clay particles substantially free of such fine grit.

2. The method of separating substantially grit-free impalpable clay from dried clay products containing pellets, which comprises subjecting clay comprising grit of substantially imperceptible fineness and containing such pellets to a combined disintegrating and air separating treatment whereby the clay freed from such grit particles is removed by the air separating treatment.

3. The method of treating clay which comprises air drying clay comprising grit of substantially imperceptible fineness, disintegrating it to produce a clay product containing pellets comprising such fine grit particles, drying the disintegrated clay, and subjecting the dried clay to a treatment which includes a combined air separation and detrition treatment to recover the fine clay particles substantially free of such fine grit.

4. The method of treating clay which comprises subjecting air dried clay comprising grit of substantially imperceptible fineness to a rough disintegration to form a product containing pellets and fine clay comprising such fine grit particles, drying the disintegrated clay, subjecting the disintegrated clay to a preliminary air separation to remove fine clay particles therefrom, and subjecting the remaining clay with such grit-bearing pellets to a combined disintegrating and air separation treatment to remove additional clay substantially free of such fine grit.

5. The method of producing a substantially grit free impalpable powder from clay which comprises air drying clay comprising grit of substantially imperceptible fineness in lumps as taken from the mine, rough crushing the air dried lumps so as to leave a substantial part of the clay in the form of pellets and subjecting the rough crushed material to a disintegrating treatment in the presence of a draft of air of velocity sufficient to carry off in suspension separated particles of clay but insufficient to carry off the grit particles or unseparated aggregates of clay whereby the clay is recovered substantially free of such fine grit.

6. The method of treating clay to produce a substantially grit-free impalpable powder which comprises separating clay comprising grit of substantially imperceptible fineness into relatively small lumps, subjecting such lumps to a disintegrating treatment in a current of air, the velocity of which is regulated so that the particles of clay of the fineness desired will be carried off therein but the particles of fine grit, aggregates of clay particles, and clay particles of too large size will not be entrained therein whereby the fine clay particles substantially free of such fine grit is recovered.

In testimony whereof I affix my signature.

WILLIAM H. ALTON.